United States Patent

Morris

[15] 3,648,595
[45] Mar. 14, 1972

[54] FOOD FRYER WITH CONTINUOUSLY FILTERED COOKING OIL

[72] Inventor: Wolford A. Morris, Springfield, Ill.
[73] Assignee: Restaurant Products, Inc., Springfield, Ill.
[22] Filed: Apr. 22, 1970
[21] Appl. No.: 30,650

[52] U.S. Cl. .............................. 99/342, 99/337, 99/408, 210/90, 210/167, 210/493, 210/DIG. 8
[51] Int. Cl. ........................................... A47j 37/12
[58] Field of Search ............... 210/167, 90, 493, DIG. 8; 99/408, 330, 332, 403, 404, 407, 418, 336, 337, 342

[56] References Cited

UNITED STATES PATENTS

| | | | |
|---|---|---|---|
| 3,483,982 | 12/1969 | Nelson | 210/167 |
| 2,578,129 | 12/1951 | Daugherty | 99/408 |
| 3,241,680 | 3/1966 | Humbert | 210/493 |
| 2,733,815 | 2/1956 | Kwochka et al. | 99/408 UX |
| 2,652,767 | 9/1953 | Childs | 99/408 |
| 3,398,673 | 8/1968 | Koplock | 210/167 X |
| 3,280,722 | 10/1966 | Rahauser | 99/332 |
| 3,107,601 | 10/1963 | Longmire | 99/330 |
| 3,431,835 | 3/1969 | Angold | 99/408 |
| 2,287,396 | 6/1942 | Roth | 99/403 X |
| 3,097,589 | 7/1963 | Moore | 99/408 |

*Primary Examiner*—Billy J. Wilhite
*Attorney*—Louis Bernat

[57] ABSTRACT

In a deep-fat cooking appliance, a cooking oil circulation system includes a filter assembly which has a disposable porous filter. A motor pump continuously draws oil from a midpoint in a deep cooking well and through the filter. The oil returns to the deep well via a downspout poised above a splash ledge in the deep well so that there is a minimum of agitation in the oil. A clogged filter alarm indicates when the porous material should be replaced.

20 Claims, 13 Drawing Figures

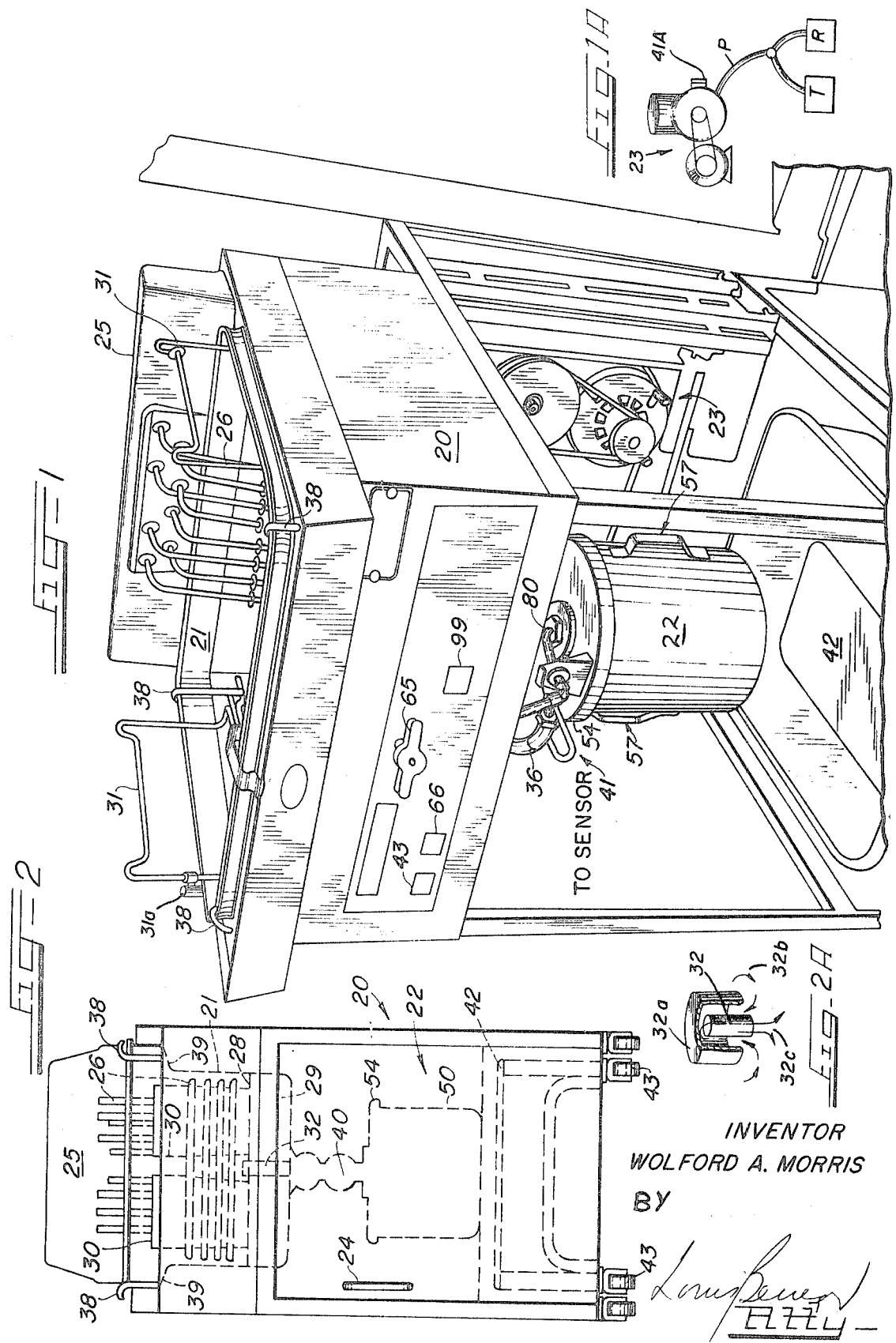

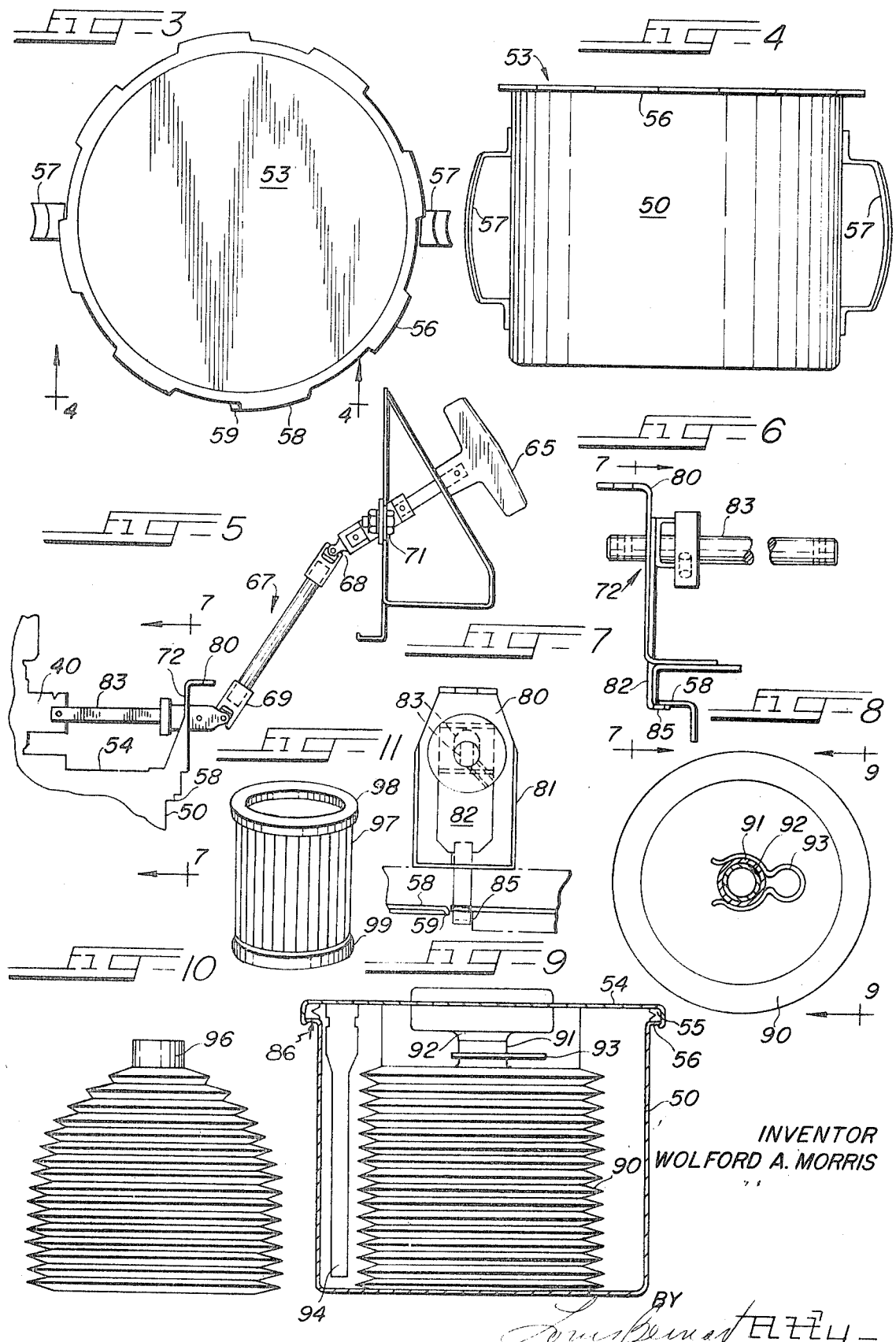

FOOD FRYER WITH CONTINUOUSLY FILTERED COOKING OIL

This invention relates to food fryer appliances, and more particularly to built-in fryers with continuously operating oil circulating and filtering devices.

Deep-fat fried foods are very popular. French-fried potatoes or deep fried chicken are just two examples of the many such fried foods which could be cited. Generally speaking, these and similar foods are cooked by being dropped into and covered by boiling oils. The oils enter into and become part of the food while the heat of the boiling oils cooks the food.

Even a moment's reflection makes it obvious that the quality of the cooking oil is of prime importance. First, human health and well-being are at stake. The oil must be completely digestible and free of all contaminants which could endanger the health or well-being of persons eating the foods. Second, assuming that there is a completely safe oil, the problems of taste are important. If the oil is rancid, there is not much point in deep-fat frying a food in an effort to enhance its aesthetic taste qualities.

There are still other reasons, not directly related to the food qualities, for using cooking oil processing appliances. One of these reasons relates to the need for cleaning the fryer and keeping the plumbing clean and free of grease. Another reason relates to simplicity of operation, low-cost maintenance, and ease of changing filters without taking the fryer out of service. Yet another reason for oil processing is to enable reuse of the shortening and, therefore, to cut cooking costs.

Various commercial products and appliances are presently offered to restaurateurs to enable them to process the cooking oil and thereby improve the quality and taste of fried foods. For example, small portable cooking oil processing units may be brought to the large counter fryers. These units pump the cooking oil in the counter fryers through oil filters and strainers which remove acids, odors, general sediments, and taste residues from previously cooked foods. Generally, they do not process the oil continuously during the cooking. Another problem is that they do not enable the persons who use the processing unit to handle hot oil with a minimum possibility of danger of burning them.

The foregoing are only a few of the considerations which apply to the use and design of deep-fat food fryers. Still other considerations will readily occur to those who are skilled in the art.

Accordingly, an object of the invention is to provide new and improved cooking oil processing apparatus for food fryers. In this connection, an object is to provide food fryers having continuously circulating cooking oils, with filtration, throughout the entire cooking cycle. Here, an object is to provide a cooking oil filtration system having automatic sensing, with alarm means operated when the system requires attention. In greater detail, an object is to sense troubles and give a signal when the filter is clogged and must be changed.

Yet another object of the invention is to provide new and improved cooking oil processing equipment which is easier to operate and maintain. Here an object is to provide a relatively safe deep-fat fryer which may be used and maintained with a minimum danger from splattering of hot grease, especially while oil is being removed from the fryer. In this connection, an object is to enable the oil or filter to be changed without interrupting a cooking cycle. In particular, an object is to preclude opening the oil system while it is filled with hot oil.

In keeping with an aspect of the invention, the fryer includes a deep well for holding and heating the cooking oils as well as receiving a cooking basket containing the food to be cooked. A cold oil chamber is provided at the bottom of a deep cooking container to trap sediment suspended in the oil. During cooking, the cooking oil is pumped from a point above the cold oil chamber (without disturbing the trapped sediment), through a filter for purifying the oil, and back into the deep well. The filter may take any of several forms such as a pleated paper cylinder; however, a preferred embodiment utilizes a cylindrical housing for receiving a pleated filter paper bag. A pipe carries the cooking oil into the center of the pleated paper cylinder or bag. Then, the oil oozes through the filter paper and flows out into the cylindrical housing from which it is pumped back into the deep well.

The equipment for accomplishing these and other objects will be understood best from a study of the following specification and the attached drawings in which:

FIG. 1 is a perspective view of a floor model deep-fat fryer incorporating the principles of the invention;

FIG. 1A shows a motor-pump combination having a pressure or vacuum sensor t hereon;

FIG. 2 is a schematic representation of the housing of FIG. 1;

FIG. 2A shows a downdraft baffle for drawing larger sediment into a settling area of the well;

FIG. 3 is a top plan view of a housing for receiving the filter assembly;

FIG. 4 is a front elevation view of the assembly of FIG. 3 taken along line 4—4;

FIG. 5 schematically illustrates an interlocking arrangement for preventing a removal of the filter housing while it is filled with oil;

FIG. 6 is a side view which shows the latch arrangement controlled by the handle of FIG. 5;

FIG. 7 is a front view of the latch of FIG. 6 taken along line 7—7 of FIGS. 5 and 6;

FIG. 8 is a plan view of a first embodiment of a pleated filter paper bag;

FIG. 9 is a side elevation view of the filter of FIG. 8 taken along line 9—9 thereof;

FIG. 10 is a side elevation view of a second embodiment of the invention; and

FIG. 11 is a perspective view of an open-ended pleated paper cylinder filter with a suitable compressible ring at each end which seals the filter against the top and bottom of the filter housing when assembled for use.

The major assemblies of FIGS. 1 and 2 comprise a cabinet, support, or housing 20, a deep well 21 for receiving the cooking oil, a filter assembly 22, and a motor-driven pump assembly 23.

The housing 20 may take any form which is suitable for the intended environment. For example, it could be a simple angle iron stand; or, it could be made of brushed stainless steel with or without decorative or colored panels. Preferably, at least one door 24 is provided on one side of the cabinet in order to give access to the filter assembly 22. The top of the cabinet is open to provide access to the deep well 21. The back of the top includes a splash panel 25 and an assembly (not shown) for pivotally supporting one end of a heating element 26. This way, the element 26 may be swung upwardly on the pivot to be out of the way for cleaning. The electrical element 26 heats the cooking oil.

The deep well 21 is divided into two parts by a perforated basket or screen 28 which may be lifted out for easy cleaning. This basket allows the larger particles from the cooked foods to fall into an accumulation area 29 filled with relatively cold oil. Supported on and nesting within the strainer element 28 are one or more containers 30, 30 for receiving the food being cooked. A pair of hangers 31 are provided to support the food containers above the cooking oil. These hangers may or may not be provided to support the food containers when they are out of the oil. These hangers may be attached to a suitable off and on switch 31a for turning off the fryer motor when the food is removed from the oil.

According to the invention, the cooking oil in the well 21 is filtered continuously during the cooking process. In greater detail, the space 29 beneath the screen 28 forms a sump or chamber for accumulating large food particles. Projecting above this chamber 29 is an overflow pipe 32. This is important since pump 23 may draw the cooking oil from the space above the screen 28, thus leaving the trapped sediment undisturbed in the area 29. This way, the larger sediment is prevented from entering the filtration system, thereby greatly prolonging the life of the filter. In another embodiment (FIG. 2A) suitable baffles 32a may be included to form a downdraft 32b which positively pulls larger sediment particles from the cooking area and into the chamber 29 before oil 32c enters the filter housing. The oil is pumped through the pipe 32, into the filter housing 22, through pipe 36, pump 23, and one or more downspouts 38, to the deep well 21.

Means are provided for reintroducing oil into the deep well without agitating the oil or washing the food by a swift-flowing stream of oil. More particularly, as best seen in FIG. 2, the downspouts 38 direct the flow of oil onto a ledge 39 in the deep well 21. This ledge acts somewhat as a splash block and somewhat as a deflector. Thus, there is a gentle flow of oil back into the well which does not disturb the food in the containers 30, 30. Heretofore, the tendency has been to shower the food with the returning stream of oil, and this adversely affected the cooking. For example, it washed the batter off a deep fried meat.

A manual or automatic valve 40 may close off the overflow pipe 32 to retain the cooking oil in the deep well 21 when it is necessary to service the filtration system. This valve closure causes the pump 23 to completely empty the oil from the housing 22 and deposit it in the well 21. This emptying enables a disposal and replacement of filter 90, cleaning of the filter housing 22, for example, without stopping the cooking process.

A sensor 41, in pipe 36, detects a pressure change in the oil distribution system, which indicates when a clogged filter is in need of changing. An alternative position places the sensor 41a on the pump 23, FIG. 1A. When the sensor 41 is in a position indicating a clogged filter, such position is caused by an increased vacuum formed in the pipe 36 responsive to the pump 23 trying to pull the oil, which will not flow through the filter housing 22.

When such increased vacuum occurs, a signal is sent from sensor 41 over a wire (not shown) to light an indicator lamp at 43. The lamp remains lighted until the filter housing 22 is serviced, valve 40 is opened, and oil flow at a proper pressure resumes in the pipe 36. Thereafter, oil passes freely through the filter housing 22. Since only a normal vacuum builds up in the pipe 36, the sensor 41 no longer sends any clogged filter alarm signal. The lamp at 43 is again dark. Multicolor lights may be used in connection with sensor means for detecting degrees of pressure or vacuum in order to indicate the relative condition of the filter.

If desired, a suitable drain pipe P (FIG. 1A) may be provided as an outlet for draining oil from the system. Since it is connected to the output side of the pump 23, this pipe enables a forcible power draining of all oil from the system at high speed. It is not relevant whether the oil is drained into a storage tank T or into an external receptacle R. If the filter 22 is completely emptied of all oil before it is cleaned out, it reduces the possibilities of injuries caused by the hot oil.

An alternative method of emptying the entire oil system is to remove the housing 22 and then pull out the overflow pipe 32. Thereafter, all of the oil in the system will simply run out and fall into a tank 42 which may be mounted on wheels 43 for easy removal from the cabinet 20.

FIGS. 3 and 4 show how the filter housing is made, in one exemplary embodiment of the invention. The principal elements of this filter housing are a cylindrical, somewhat bucketlike housing 50 having an open top 53 which may be closed by a cover 54 (FIG. 1), permanently secured to the bottom of the well 21. Both inlet and outlet pipes (not shown) are connected through to fittings in the cover 54 to the valve 40 and the pipes 32, 36 of the cooking oil distribution system. Any or all of these housing openings and fittings may be sealed in any suitable manner, as by means of "O" rings or gaskets at 55 (FIG. 9). Also, any of these parts may be flanged and machined to improve the seal. For example, FIG. 3 shows a number of bayonets or ears (such as 56) which fit into and lock against mating ears or bayonets (not shown) in the cover 54. Thus, when the cover 54 is in place on top of the housing 50 and the suitable fittings are secured, the entire unit is sealed to preclude leakage of hot cooking oil.

A pair of handles 57 on the housing 50 facilitates handling and locking. Thus, it is only necessary to fit the upper edge 56 of the housing 50 up into the bottom of the top 54 and pull the handles 57 sidewise, thus giving the bottom 50 a fraction turn and locking it into position.

Means are provided for locking the housing in a closed position so that it is not possible to open the oil system while filled with hot oil. More particularly, at least one of the bayonets 58 on the top of the housing 50 has a tab 59 which limits the rotation of the housing when in its closed position. When in the closed position, a suitable key is also fitted between the bayonet and stop so that the housing cannot be opened.

In greater detail, a handle 65 is located on the front of the housing, as shown in FIG. 1, to control the valve 40. When the handle is in one position, the valve 40 is open, the filtration system is in operation, and the housing 22 cannot be opened. When the handle 65 is rotated by 90°, the valve 40 is closed, the oil is pumped out of the housing 50, and thereafter it may be removed. The light 66 lights when the housing 50 is empty, as signalled when the pump and motor stop after a pretimed cycle.

The top of the housing 22 is seen in outline at 54 (FIG. 5). The bayonet 58 and the housing 50 are also shown in outline. A rotatable valve is outlined at 40. The handle 65 is connected to the valve 40 by a shaft 67 having two universal joints 68, 69 therein. Suitable journals 71, 72 are provided for rotatably supporting this assembly. Therefore, it should be apparent that when the handle 65 is rotated, the valve 40 is opened or closed. Since the pump 23 runs continuously, all oil is drained out of the housing 50 and into the deep well 21 after the valve 40 is closed.

A latch mechanism 80 is shown in detail in FIGS. 6 and 7. This mechanism includes a support bracket 81 having a cover lock slide 82 mounted thereon. A shaft 83 in the handle-to-valve assembly 67 extends through the support bracket 81 and the cover lock slide. The shaft 83 moves a camlike assembly up and down as the handle is turned. Thus, when the handle is in one position, the equipment is in the position shown in solid lines in FIG. 7. The lower end of the cover lock 82 interferes with the stop 59. The housing 50 cannot be removed.

When the handle is rotated, the cam arrangement causes the cover lock 82 to move downwardly, as shown in dotted lines at 85. There is no interference between the cover lock 82 and the stop 59. Therefore, the handles 57 may be used to rotate the housing 50 so that it will separate from the cover 54.

Normally, the housing cannot be removed. When a person using the system observes that the lamp 43 is lighted, he knows that the filter needs changing. Then, the person turns the handle 65 to close the valve 40. The pump 23 drains the housing into the well 21. When the hot cooking oil stops flowing followed by the pump and motor shutting off, signal 66 lights, and the housing 50 is removed. Excess oil drips into the container 42. If the entire oil system is to be emptied, pipe 32 is removed and valve 40 is opened by handle 65 with housing 50 removed, and all of the oil runs down into the container. In some embodiments it may be well to provide a sensor 86 which includes a feeler arm and a microswitch that operates when the top 54 and the housing 50 are tightly sealed against each other in an operative condition. This switch disables the motor-pump 23 at any time when the housing is not tightly sealed and may leak. This safety feature also helps to prevent injuries by burning oil.

Inside the housing 50 is a disposable filter paper cylinder, bag, or sleeve 90 of porous filter material. The upper end 91 of the cylinder, bag, or sleeve 90 is formed into a cuff or, in the case of the bags, other suitably restricted neck. Mating with and fitting snugly into this neck is a drainpipe 92. A spring clip 93 fits over the neck 91 and the pipe 92 to hold the filter in place. Initially, the filter cylinder, bag, or sleeve may be shipped in a fully collapsed condition to save space. Then, after the cylinder, bag, or sleeve is attached to the pipe 92, cooking oil enters and fills it and causes it to expand and bottom on the housing 50. Thus, the housing 50 and the filter material 90 form a pair of concentric, coaxial cylinders when the assembly is put together and completely expanded.

To facilitate and enable the assembly of the filter, the drainpipe 92 is sealed to the cover 54 in any suitable manner. The outlet 94, which discharges the cooking oils from the housing 50, directs it to the downspouts 38 for allowing the oil to gently flow into the deep well 21.

In one exemplary system, the filter may be melamine treated or poly treated so that edible cooking oils are filtered with the flow of the fluid being 1 to 3 gallons per minute, as follows:

45 lbs. of cooking oil with a temperature range from 275° to 400° F.

Contaminates, food sediments, carbonized particles, odors, and flavors are strained out Replacement of paper filter occurs when the filtration is reduced to 70 percent of initial efficiency Porosity—50 microns approximately (based on equivalent filter unit rating)

Size of Inlet Pipe 92 to Filter — 1 inch

Size of Outlet Pipe 94 — ½ inch.

The deep frying uses vegetable oils, such as cottonseed, peanut, soybean, corn oils, leaf lards, and the like. Discharge from the deep well 21 is through the drainpipe 92 and into the cylinder, bag or sleeve of filter material 90. The oil oozes through the filter material 90 to the inside of the housing 50. The cleanly filtered oil inside the housing is drawn up the pipe 94 by the action of the motor-driven pump 23. The oil circulates from the pipe 94 through the pipes 36 and 38 and back to the deep well 21.

An alternative embodiment of the filter arrangement is shown in FIG. 10. Here again, there is a top neck 96 which is attached to the drainpipe 92 to make a complete filter assembly. Here, the filter bag has a somewhat parabolic shape flaring from the neck to the bottom.

Yet another embodiment (FIG. 11) provides a disposable pleated filter paper cylinder 97 which is open at both ends and fitted with compressible rings 98, 99 at each end. These rings seal against the top 54 and the housing 50 at the bottom, when the unit is assembled for use, as in FIG. 11.

The system operates this way. After the well has been cleaned and the screen 28 is in place, the deep well 21 (FIG. 1) is filled to an indicated level with cooking oil. The heating element 26 is lowered into the oil. The frying baskets 30, 30 are placed on hangers 31 which may or may not be equipped to actuate switches and control the power at any location in the system where the power should be controlled during a cooking cycle.

A switch is operated and the heating element 26 is energized to heat the cooking oil to a thermostatically controlled temperature. A suitable light 99 may indicate when the oil reaches cooking temperature.

As soon as the oil is hot enough, the drying basket (not shown) is removed from the hanger 31 and placed in the hot cooking oil. Suitable lights may turn on to indicate that the oil is being filtered continuously. When the food is cooked, the basket is again hung on the hanger 31 to drain.

Eventually, the filter material 90 becomes clogged to restrict the flow of cooking oil. As the pump 23 continues to operate, the pressure drops in the pipe 36 to actuate the vacuum-sensing switch 41. A light 43 lights or another signal occurs.

A person in the area notices the signal and turns the handle 65 to close the shutoff valve 40 and unlock the housing 22. The motor 23 continues pumping and drains the filter assembly 22 into the deep well 21. Cooking need not stop. After the pump and motor stop, signal 66 lights; then housing 50 may be rotated with the aid of the handles 57 to allow the removal of the filter. The filter material 90 is removed and replaced. All parts of the housing are cleaned or replaced.

If the oil has been pumped from the deep well 21, the screen 28 is removed, and the cool oil parts 29 in the well area are cleaned.

From the foregoing, it should be apparent that the invention provides a superior product by continuously filtering cooking oil whenever a product is being cooked. However, if should also be recognized that other structures could be made without departing from the teachings of the invention. Accordingly, the appended claims should be construed to cover all equivalents reasonably falling within the scope and spirit of the invention.

I claim:

1. A food fryer comprising means including a deep well for receiving and heating food and cooking oil, means for continuously filtering said oil throughout cooking, said filtering means comprising a screen means in said deep well for supporting food while allowing larger particles to settle out of said cooking oil, means above the level of said screen for pumping oil into and out of a chamber of porous filter material, said oil oozing through pores in said filter material whereby the pressure of pumped oil changes responsive to a clogging of said filter material, and means responsive to said changed pressure for indicating the clogged condition of said filter.

2. The fryer of claim 1 wherein said straining means comprises a perforated member which divides the deep well into two parts, one of said two parts forming a cooking chamber, the other of said two parts forming a cool oil chamber for accumulating sediment which has settled out of said oil and fallen through said perforated member.

3. The fryer of claim 1 and means for returning said oil to said deep well without washing said food with a fast flowing current of oil.

4. The fryer of claim 1 wherein said filtering means comprises a series of pipes for conducting said oil from said deep well through said filtering means and back to said well, and a shutoff valve between an outlet of said deep well and an inlet of said filtering means, said pumping means being in said pipe between the outlet of said filter and the inlet of said deep well, whereby said pump empties said filtering means into said deep well when said shutoff valve is closed.

5. The fryer of claim 1 wherein said pumping means is coupled to an outlet of said filtering means, said means responsive to said changed pressure comprising a vacuum sensor coupled between an outlet from said filter and said pumping means.

6. A deep fat fryer comprising a deep well having a bottom with a drain therein, housing means comprising a cover directly connected to said drain, a bucketlike means having an open top fitting into said cover, clamp means for selectively attaching or detaching said bucketlike means to said cover, filter means comprising a tubular sleeve of porous material resting in said bucketlike member and compressed against said cover when said clamp means is operated, and means for pumping cooking oil from said bucket member back into said well, said drain discharging oil from said well on one side of said filter material and said pump sucking oil from the other side of said material, whereby said oil must pass through said filter as said oil moves between said drain and said pump.

7. A deep fat fryer comprising a deep well for receiving cooking oil and food to be cooked, a filter assembly beneath said deep well, oil circulating means including a motor-pump assembly for circulating oil from said deep well through said filter assembly and returning said oil to said deep well without causing fast-flowing currents in said oil, wherein said filter assembly comprises a housing having an inlet and outlet for enabling the flow of oil through said housing, and a sleeve of porous filter material interposed between said inlet and outlet so that oil must ooze through the pores of said filter material in order to pass from said inlet to said outlet, wherein said filter material is a pleated filter paper bag which clips onto the inlet of said housing.

8. The fryer of claim 7 and means for locking said housing in a closed condition if said housing has hot cooking oil therein.

9. The fryer of claim 8 and means for settling said cooking oil before said oil enters said filter material, thereby precluding entry of large particles into said filter paper bag.

10. A deep-fat food fryer comprising a deep well with an outlet, said well comprising means for receiving cooking oil and food to be cooked in said oil, means in said well for heating said oil to the range of 275° to 400° F., and filter means comprising a bag of filter material, the top of said bag being attached to said outlet of said well, said bag being circumferentially pleated to collapse said bag vertically for shipment and storage and to expand said bag responsive to flow of said oil from said deep well and into said filter bag.

11. The fryer of claim 10 wherein said bag is of cylindrical shape when expanded.

12. The fryer of claim 10 wherein said bag has a generally parabolic cross section flaring from the point where said bag is attached to said well to the bottom of the bag.

13. The fryer of claim 12 wherein said bag is made of paper having a porosity of 40 to 65 microns.

14. The fryer of claim 13 wherein said paper is treated with melamine.

15. A deep fat fryer comprising a deep well for receiving cooking oil, said well having a deflector means extending along at least a part of its peripheral wall, means comprising a porous filter for filtering cooking oil during a cooking cycle, a down spout positioned to discharge cooking oil onto said deflector means, thereby precluding swift currents in the cooking oil in said well, and pump means for pumping oil from said well, through said porous filter, and back into said well via said down spout, whereby said oil is filtered continuously during cooking and returned to said well with a gentle flow of oil which does not wash or disturb the food in said well.

16. The fryer of claim 15 wherein means associated with said fryer comprising a filter housing which is formed to open or close, said filter assembly is a disposable pleated filter paper having compressible rings at each end thereof, and said rings are sealed against the opposite sides of said housing when said housing is in a closed condition.

17. A deep-fat fryer comprising a deep well having a drain leading to a filter housing, said filter housing comprising a cover having bayonet ears distributed around the periphery thereof and a bucketlike member having mating bayonet ears which interlock with the bayonet ears on said cover when the bayonet ears on said bucketlike member are fitted into said cover and rotated slightly, filter means comprising a tubular sleeve of porous material resting in said bucketlike member and compressed against said cover when said bucket member is rotated and said bayonet ears are interlocked, and means for pumping cooking oil from said bucket member back into said well, said drain discharging oil from said well on one side of said filter material and said pump sucking oil from the other side of said material, whereby said oil must pass through said filter as said oil moves between said drain and said pump.

18. The fryer of claim 17 and means for locking said housing in a closed condition if said housing has hot cooking oil therein.

19. The fryer of claim 17 wherein said porous material is paper having a porosity of 40 to 65 microns.

20. The fryer of claim 19 wherein said paper is treated with melamine.

* * * * *